(12) United States Patent
Lee

(10) Patent No.: US 12,406,482 B2
(45) Date of Patent: Sep. 2, 2025

(54) SENSOR FUSION-BASED OBJECT DETECTION SYSTEM AND METHOD FOR OBJECTS WITH A COMPLEX SHAPE OR LARGE-SIZE

(71) Applicant: ThorDrive Co., Ltd., Seoul (KR)

(72) Inventor: Soomok Lee, Gyeonggi-do (KR)

(73) Assignee: ThorDrive Co., Ltd., Seoul (KR)

( * ) Notice: Subject to any disclaimer, the term of this patent is extended or adjusted under 35 U.S.C. 154(b) by 455 days.

(21) Appl. No.: 17/743,290

(22) Filed: May 12, 2022

(65) Prior Publication Data

US 2024/0412498 A1 Dec. 12, 2024

(30) Foreign Application Priority Data

May 13, 2021 (KR) .......................... 10-2021-0062288

(51) Int. Cl.
| | | |
|---|---|---|
| *G06V 10/86* | (2022.01) | |
| *G01S 17/86* | (2020.01) | |
| *G01S 17/894* | (2020.01) | |
| *G06V 10/26* | (2022.01) | |
| *G06V 10/762* | (2022.01) | |
| *G06V 10/80* | (2022.01) | |
| *G06V 10/84* | (2022.01) | |

(52) U.S. Cl.
CPC ............ *G06V 10/811* (2022.01); *G01S 17/86* (2020.01); *G01S 17/894* (2020.01); *G06V 10/26* (2022.01); *G06V 10/762* (2022.01); *G06V 10/84* (2022.01)

(58) Field of Classification Search
CPC .... G06V 10/811; G06V 10/26; G06V 10/762; G06V 10/84; G01S 17/86; G01S 17/894
See application file for complete search history.

(56) References Cited

U.S. PATENT DOCUMENTS

| | | | |
|---|---|---|---|
| 9,329,269 B2* | 5/2016 | Zeng ........................ G01S 17/58 |
| 10,438,371 B2* | 10/2019 | Xu ........................ G06V 10/454 |
| 11,062,454 B1* | 7/2021 | Cohen ..................... G01S 7/417 |
| 11,423,661 B2* | 8/2022 | Sakamoto ............. G06V 20/58 |
| 11,527,085 B1* | 12/2022 | Widjaja ................. G06V 20/58 |
| 11,645,360 B2* | 5/2023 | Litvak ................... B60W 30/09 |
| | | | 701/26 |

(Continued)

*Primary Examiner* — Gregory A Morse
*Assistant Examiner* — Ronde Lee Miller
(74) *Attorney, Agent, or Firm* — Morgan, Lewis & Bockius LLP

(57) ABSTRACT

The present invention relates to a sensor fusion object detection system and method of deriving the object segmentation information including segmented point segments for each object by clustering a point cloud obtained from a LIDAR sensor, deriving object recognition information for each object from an image obtained from a camera sensor, and deriving object point groups using a graph-based probability optimization technique based on a first probability as to whether each point segment calculated based on the object segmentation information and the object recognition information correspond to a particular object and a second probability as to whether two different point segments correspond to the same object and merged as one. According to the object detection system and method according to the present invention, there is an effect that it is possible to accurately detect an object having a complex shape or a large size.

18 Claims, 10 Drawing Sheets

(56) References Cited

U.S. PATENT DOCUMENTS

| | | | |
|---|---|---|---|
| 11,703,566 B2* | 7/2023 | Cohen | G06T 7/11 |
| | | | 382/159 |
| 12,086,933 B2* | 9/2024 | Radha | G06T 7/70 |
| 12,100,154 B2* | 9/2024 | Iwase | G06T 7/11 |
| 2009/0316988 A1* | 12/2009 | Xu | G06F 18/214 |
| | | | 382/173 |
| 2019/0234745 A1* | 8/2019 | Lee | G01C 21/3881 |
| 2020/0219264 A1* | 7/2020 | Brunner | G01S 7/4808 |
| 2021/0004613 A1* | 1/2021 | Yang | G06V 10/454 |
| 2021/0063578 A1* | 3/2021 | Wekel | G01S 17/894 |
| 2021/0146952 A1* | 5/2021 | Vora | G06V 20/58 |
| 2021/0149022 A1* | 5/2021 | Kehl | G01S 13/862 |
| 2021/0150230 A1* | 5/2021 | Smolyanskiy | G06V 10/764 |
| 2021/0150280 A1* | 5/2021 | White | G01C 21/3605 |
| 2021/0180961 A1* | 6/2021 | Oh | G05D 1/0214 |
| 2021/0334988 A1* | 10/2021 | Xiao | G06F 18/2193 |
| 2021/0342609 A1* | 11/2021 | Smolyanskiy | G06V 10/803 |
| 2021/0343022 A1* | 11/2021 | Cohen | G01S 13/865 |
| 2022/0080999 A1* | 3/2022 | Vora | G06N 3/045 |
| 2022/0126873 A1* | 4/2022 | Alghanem | B60W 30/0956 |
| 2022/0309794 A1* | 9/2022 | Rykov | G06F 18/23 |
| 2023/0196749 A1* | 6/2023 | Mahendran | G06V 20/56 |
| | | | 706/25 |
| 2023/0334673 A1* | 10/2023 | Rajan | G06V 20/70 |
| 2024/0185434 A1* | 6/2024 | Wyffels | G01S 17/931 |

\* cited by examiner (a) (b)

(a)        (b)        (c)

SENSOR FUSION-BASED OBJECT DETECTION SYSTEM AND METHOD FOR OBJECTS WITH A COMPLEX SHAPE OR LARGE-SIZE

FIELD

The present invention relates to a method and system for detecting an object, and more specifically, to an object detection method and system capable of accurately recognizing an object having a complex shape or a large size by fusing recognition results by one or more sensors based on an optimization technique.

BACKGROUND

Autonomous driving (or automatic driving, unmanned driving) refers to self-driving without the intervention of a human driver, and for this purpose, it is an essential process to recognize the driving environment surrounding an autonomous driving device. That is, in order to plan a drivable moving path and actually drive the driving device accordingly, a process of detecting an object located in a driving path must be preceded.

The autonomous driving device uses a camera, LiDAR, radar, and an ultrasonic sensor, etc. to recognize surrounding objects.

Information obtained from a camera is the intensity appearing in three wavelength bands of the visible light band of a subject projected in the direction perpendicular to the camera. A general method of recognizing an object from the information obtained from a camera is to segment a region where the object is placed (region selection) and classify the object in the corresponding region.

The information from one or more LiDAR sensors are data expressed as a point cloud (or point group) in a three-dimensional space, which is obtained by emitting a laser and analyzing light reflected from a surface of the subject. A general method of recognizing an object from information obtained from the LiDAR sensor is to segment points for each object.

The radar sensor analyzes an electromagnetic wave reflected from the surface of the subject by emitting an electromagnetic wave instead of laser of the LiDAR sensor, and an ultrasonic sensor calculates a distance by measuring reflection from a surrounding object after transmitting an ultrasonic wave. A surrounding object can be also recognized through data obtained by the radar sensor, the ultrasonic sensor, etc.

Unlike a general object commonly recognized in a driving environment, detection of an object having a complex shape or a large size is not easy to achieve using the existing object detection method.

When a stereo camera is used, distance (or depth) information can be obtained along with an image of the object. Since the distance information is not uniform when the object has an irregular shape that includes a large number of concave or convex parts, it is difficult to accurately recognize the distance using only information derived from the stereo camera.

In addition, when recognizing an object having a complex shape or a large size through the LiDAR sensor, an over-segmentation problem occurs in which points are not segmented for each object and one object is easily divided into several point groups, because it has so many shaded areas or intermittent point cloud information not only because various concave or convex parts are included but also because the object is excessively large.

As a result, according to the prior art, there has been a problem that an object having a complex shape or a large size cannot be accurately recognized, and the present invention is made to solve this problem.

SUMMARY

An object of the present invention is to provide an improved object detection method and system capable of accurately recognizing an object having a complex shape or a large size.

Another object of the present invention is to provide a method and system for accurately recognizing one or more pieces of information among an exact size, shape, direction, and type (or label) of an object by fusing sensing results obtained from two or more sensors.

Another object of the present invention is to provide an autonomous driving device capable of accurately recognizing an object having a complex shape or a large size to set a drivable path.

A sensor fusion object detection system according to an embodiment of the present invention for solving the technical problem includes: a LIDAR detector that derives object segmentation information including point segments for each object obtained by clustering a point cloud from a LIDAR sensor; a camera detector that derives object recognition information for each object from an image obtained from a camera sensor; and a fusion recognition unit that derives object point groups segmented for each object using the object recognition information and the object segmentation information, in which the fusion recognition unit may include an optimization unit that derives the object point groups using a graph-based probability optimization technique based on a first probability as to whether each point segment corresponds to a particular object and a second probability as to whether two different point segments correspond to the same object, calculated based on the object segmentation information and the object recognition information.

According to an embodiment of the present invention, the object recognition information may include object region information and object label information for each recognized object, the fusion recognition unit may further include a camera information association unit that calculates a third probability, which is a probability that each point segment corresponds to the object label information, based on a ratio at which points corresponding to each point segment of the object segmentation information match the object region information corresponding thereto, and the optimization unit may calculate the first probability based on the third probability.

According to an embodiment of the present invention, the object recognition information may further include reliability information which is a probability that a recognized object corresponds to the object label information, and the camera information association unit may calculate the third probability by multiplying the reliability information by a ratio at which points corresponding to each point segment of the object segmentation information match the object region information corresponding thereto.

According to an embodiment of the present invention, the object recognition information may include object direction information for each recognized object, the fusion recognition unit may further include a LIDAR information analysis unit that determines a center point segment among the point segments based on the object direction information and calculates a fourth probability which is a probability that each point segment corresponds to the same object as an object to which the center point segment corresponds in consideration of a distance and geometric relationship with the center point segment, and the optimization unit may calculate the first probability based on the fourth probability.

According to an embodiment of the present invention, the LiDAR information analysis unit may calculate the fourth probability to be high when a direction vector of the center point segment and a direction vector of each point segment are toward a vertical or parallel geometric pattern.

According to an embodiment of the present invention, the fusion recognition unit may further include a graph expression conversion unit that converts the object segmentation information into a graph format by expressing the point segments as nodes and expressing a relationship between the point segments as an edge.

According to an embodiment of the present invention, a relationship between the object point segments, which can be expressed as an edge by the graph expression conversion unit, may include a geometric relationship between the object point segments and/or a characteristic difference relationship between the object point segments.

According to an embodiment of the present invention, the object recognition information may include object region information, object direction information, and object label information for each recognized object, the fusion recognition unit may further include a camera information association unit that calculates a third probability, which is a probability that each point segment corresponds to the object label information, based on a ratio at which points corresponding to each point segment of the object segmentation information match the object region information corresponding thereto, and a LIDAR information analysis unit that determines a center point segment among the point segments based on the object direction information and calculates a fourth probability, which is a probability that each point segment corresponds to the same object as an object to which the center point segment corresponds, in consideration of a distance and geometric relationship with the center point segment, and the optimization unit may calculate the first probability based on the third probability and the fourth probability.

According to an embodiment of the present invention, the optimization unit may calculate the second probability based on one or more of a difference (distance) in centroid point, a difference in average height, a direction difference in a direction vector, a difference in average reflection intensity, a difference in average color, a difference in average black-and-white intensity, and a difference in average thermal temperature between two different point segments.

According to an embodiment of the present invention, the first probability is determined based on whether the object segmentation information of the LiDAR detector coincides with the object recognition information of the camera detector.

A method of detecting an object by sensor fusion according to an embodiment of the present invention for solving the technical problem includes: deriving object segmentation information including segmented point segments for each object by clustering a point cloud obtained from a LIDAR sensor; deriving object recognition information for each object from an image obtained from a camera sensor; and deriving object point groups segmented for each object using the object recognition information and the object segmentation information, wherein in the step of deriving the object point groups segmented for each object, deriving the object point groups using a graph-based probability optimization technique based on a first probability as to whether each point segment corresponds to a particular object and a second probability as to whether two different point segments correspond to the same object calculated based on the object segmentation information and the object recognition information.

According to an embodiment of the present invention, the object recognition information may include object region information and object label information for each recognized object, the method may further include calculating a third probability, which is a probability that each point segment corresponds to the object label information, based on a ratio at which points corresponding to each point segment of the object segmentation information match the object region information corresponding thereto before deriving the object point groups segmented for each group, and in the step of deriving the object point groups segmented for each object, calculating the first probability based on the third probability.

According to an embodiment of the present invention, the object recognition information may further include reliability information which is a probability that a recognized object corresponds to the object label information, and in the step of calculating the third probability, calculating the third probability by multiplying the reliability information by a ratio at which points corresponding to each point segment of the object segmentation information match the object region information corresponding thereto.

According to an embodiment of the present invention, the object recognition information may include object direction information for each recognized object, the method may further include determining a center point segment among the point segments based on the object direction information and calculating a fourth probability, which is a probability that each point segment corresponds to the same object as an object to which the center point segment corresponds, in consideration of a distance and geometric relationship with the center point segment before deriving the object point groups segmented for each object, and in the step of deriving object point groups segmented for each object, calculating the first probability based on the fourth probability.

According to an embodiment of the present invention, in the step of calculating the fourth probability, calculating the fourth probability to be high when a direction vector of the center point segment and a direction vector of each point segment are toward a vertical or parallel geometric pattern.

According to an embodiment of the present invention, the method may further include converting the object segmentation information into a graph format by expressing the point segments as nodes and expressing a relationship between the point segments as an edge before deriving the object point groups segmented for each object.

According to an embodiment of the present invention, in the step of converting the object segmentation information into a graph format, a relationship between the object point segments, which can be expressed as an edge, may include a geometric relationship between the object point segments and/or a characteristic difference relationship between the object point segments.

According to an embodiment of the present invention, the object recognition information may include object region information, object direction information, and object label information for each recognized object, the method may further include, before deriving the object point groups segmented for each object, calculating a third probability, which is a probability that each point segment corresponds to the object label information, based on a ratio at which points corresponding to each point segment of the object segmentation information match the object region information corresponding thereto, and determining a center point segment among the point segments based on the object direction information and calculating a fourth probability, which is a probability that each point segment corresponds to the same object as an object to which the center point segment corresponds, in consideration of a distance and geometric relationship with the center point segment, and in the step of deriving the object point groups segmented for each object, calculating the first probability based on the third probability and the fourth probability.

According to an embodiment of the present invention, in the step of deriving the object point groups segmented for each object, calculating the second probability based on one or more of a difference (distance) in centroid point, a difference in average height, a direction difference in a direction vector, a difference in average reflection intensity, a difference in average color, a difference in average black-and-white intensity, and a difference in average thermal temperature between two different point segments.

According to an embodiment of the present invention, the first probability is determined based on whether an object recognition result based on the object segmentation information coincides with an object recognition result based on the object recognition information.

DETAILED DESCRIPTION

The present invention relates to a method and system for detecting an object, and more specifically, to an object detection method and system capable of accurately recognizing an object having a complex shape or a large size by fusing recognition results by one or more sensors based on an optimization technique.

Figure 1:
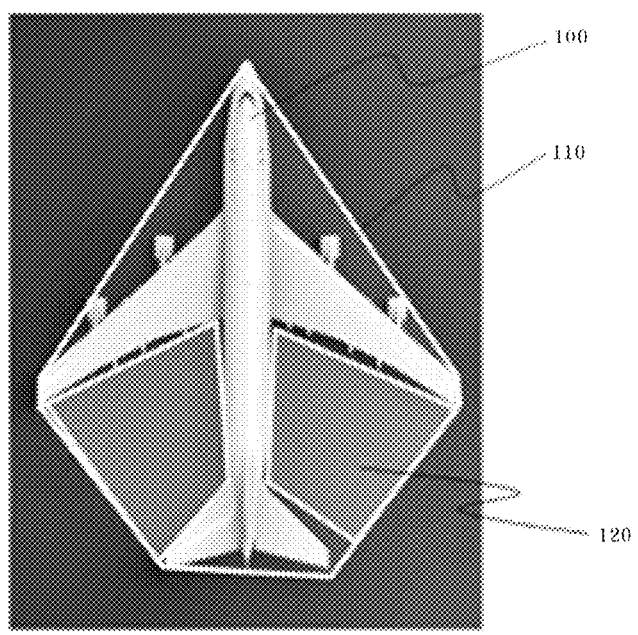
FIG. 1 illustrates an airplane as an example of a large-size object with a complex shape.

FIG. 1 illustrates an airplane as an example of a large-size object with a complex shape.

The present invention is for detecting an object having an irregular shape including concave and convex parts or having a large size. As an example of a large-size object with a complex shape, there is an airplane 100 illustrated in FIG. 1. The airplane 100 has a large size compared to an object recognized in an ordinary driving environment and has an irregular shape including concave and convex parts due to a long and streamlined body and wings extending therefrom. In addition, in the case of an airplane, since an empty space 120 between a main wing and a tail wing should not be approached except by a designated vehicle, it is important for an autonomous driving device to recognize accurate contour information 110 of the airplane. For example, in order to calculate a drivable moving path of the autonomous driving device at an airport, it is necessary to recognize an airplane located in the airport, and the present invention may be used for this purpose.

As another example, the present invention may be used for the autonomous driving device on an ordinary road to recognize a special-purpose vehicle such as an excavator or a forklift having a complex shape or a large external shape. As another example, the present invention may be used to recognize a freight car loaded with irregularly shaped cargo. As another example, the present invention may be used to recognize an articulated vehicle that is longer than a normal vehicle and having a bend that can be deflected during rotation. As another example, the present invention may be used to recognize a special-purpose vehicle used at a construction site. As another example, the present invention may be used to recognize special-purpose vehicles used in airports. In addition, an object having a complex shape or a large size to be recognized in the present invention may correspond to any one of the exemplified objects, but is not limited thereto.

Figure 2:
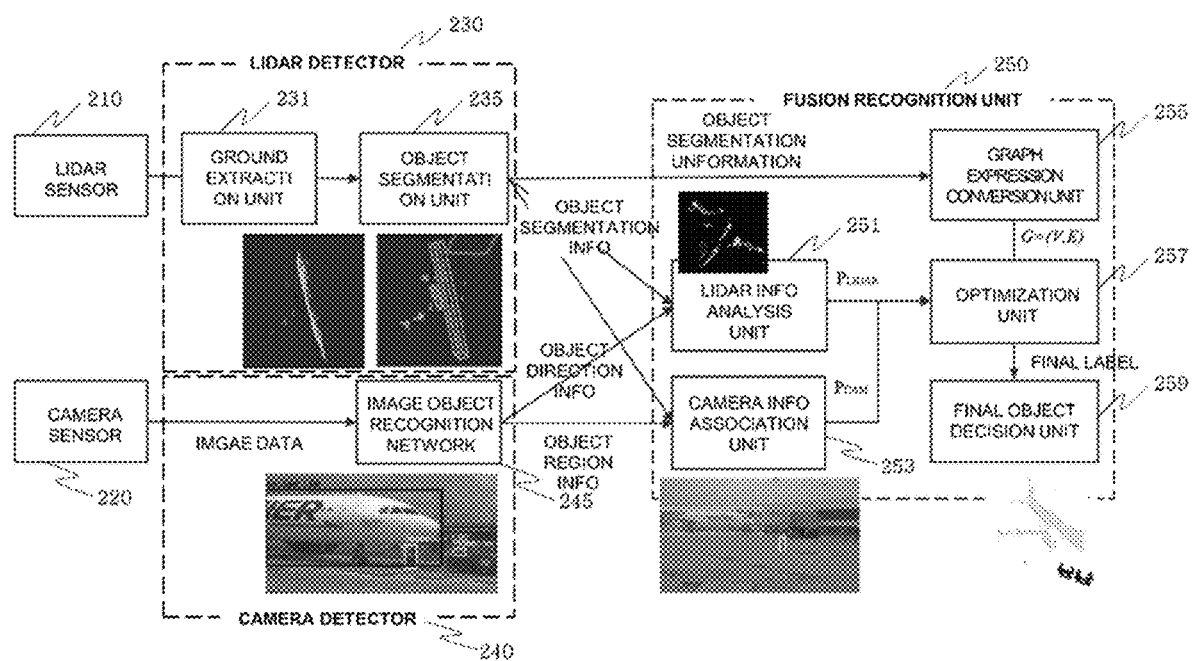
FIG. 2 illustrates an exemplary embodiment of an object detection system in accordance with the present invention.

FIG. 2 illustrates an embodiment of an object recognition system according to the present invention.

The object recognition system according to the embodiment of the present invention illustrated in FIG. 2 may include: a LIDAR detector 230 that detects object segmentation information from a LIDAR sensor 210; a camera detector 240 that extracts object direction information and object recognition information from a camera sensor 220; and a fusion recognition unit 250 that determines a final object by fusing two or more of object segmentation information, object direction information, and object recognition information.

[LiDAR Detector]

According to the embodiment of the present invention, a ground extraction unit 231 of the LiDAR detector 230 can first remove points corresponding to the road or the ground from a point cloud obtained from the LIDAR sensor 210. The ground extraction unit 231 can extract points corresponding to objects, which are distinguished from the road or the ground, by removing points corresponding to the road or the ground from a point cloud.

According to the embodiment of the present invention, an object segmentation unit 235 of the LiDAR detector 230 may cluster points close to each other among points corresponding to objects as being related to the same object. A cluster of points grouped as a single target based on a distance between the points is regarded as an object, which is referred to as an object point segment or a point segment. The object segmentation unit 235 of the LiDAR detector 230 may output object segmentation information including point segments that are a result of segmenting points for each object by clustering the points for each object.

Unlike objects recognized in general driving environments such as vehicles and people, in the case of an object having a complex shape or a large size, points corresponding to the object are not uniformly distributed since the object does not have a uniform shape. In addition, while many points are distributed in a convex region, there are not many points at the center of a concave region. Therefore, the object may be recognized as different objects with this part as a boundary, and thus point segments are easily split into several pieces.

Figure 3:
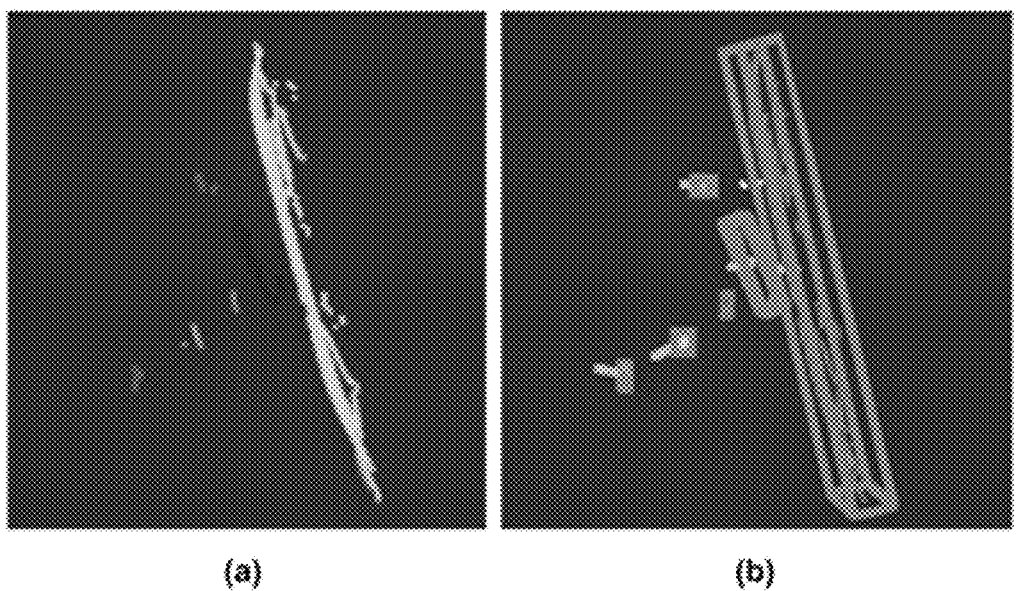
FIG. 3 illustrates an exemplary embodiment of object segmentation by a LIDAR detector in accordance with the present invention.

For example, when a point cloud obtained from the LiDAR sensor 210 for an airplane is examined, as illustrated in FIG. 3a, since the points of the fuselage of the airplane and the points of the airplane wings are not uniform and distances between the points are large, it is difficult to recognize a single object through a general point cloud segmentation algorithm for object extraction. Therefore, according to an embodiment using a general segmentation algorithm, an airplane, which is one object, may be actually clustered into five different objects, respectively, as illustrated in FIG. 3b.

In order to solve this problem, a distance between points to be clustered may be increased. However, this method may make it difficult to detect relatively small objects such as people, cars, cones, etc., which are general detection targets. After all, in order to satisfy the versatility of recognizing large and irregularly shaped objects as well as the ordinary objects to be detected at the same time, it is difficult to use values that have a large difference from a parameter (for example, a distance between clustered points) used in an existing general segmentation algorithm. Therefore, according to the embodiment of the present invention, it is possible to use a method in which the LiDAR detector 230 clusters the point cloud using parameters for detecting a general object, and point segments output as a result are later corrected through another process. According to an embodiment of the present invention, a problem of over-segmentation of an object having a complex shape or a large size can be solved by using such a later correction method.

[Camera Detector]

According to an embodiment of the present invention, the camera detector 240 may receive image data from one or more camera sensors 220 capable of ensuring an angle of view greater than or equal to a certain level. The camera detector 240 processes image data provided from the camera sensor 220 using a machine learning network (i.e, image object recognition network) 245 for image object recognition to output object recognition information including at least one of object label information (or object class information) for each object included in image data, reliability information for object label information, object region information, and object direction information.

According to an embodiment of the present invention, the object label information (or object class information) indicates a type of each object recognized through a machine learning network. For example, the machine learning network may recognize the type of each object as a person, a car, or an airplane, and output the type as the object label information (or object class information).

According to an embodiment of the present invention, reliability information for the object label information may be a probability ($P_{reliability}$) of reliability information for the machine learning network recognizing each object as a corresponding label. For example, when the machine learning network recognizes the object as an airplane with 95% confidence, the reliability information $P_{reliability}$ may be set to 0.95.

According to an embodiment of the present invention, the object region information is information about a position and a region of an object in an image. According to an embodiment of the present invention, the information may be expressed as a bounding box. According to another embodiment of the present invention, object region information for each object may be expressed as a set of pixels corresponding to the object as a result of image segmentation.

Figure 4:
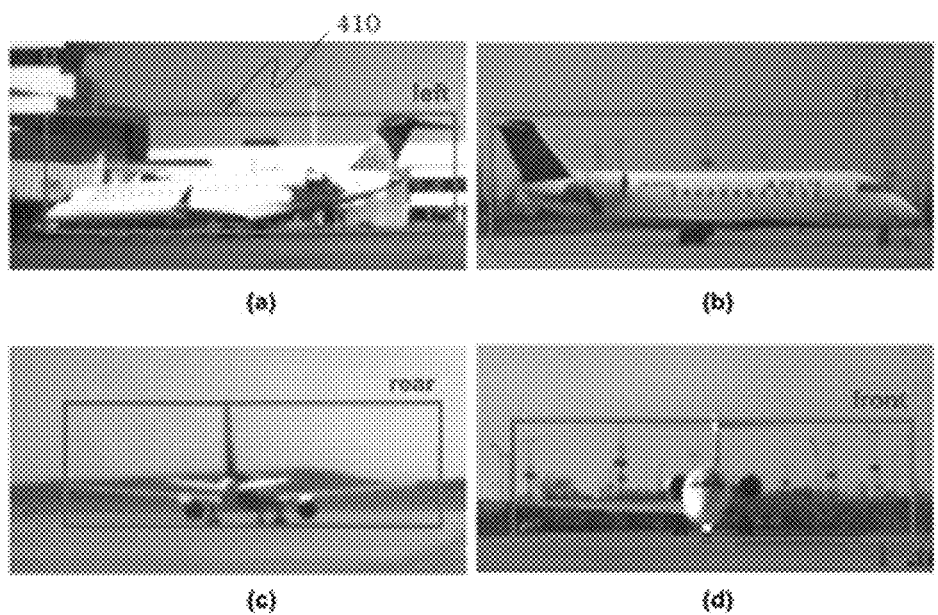
FIG. 4 illustrates an exemplary embodiment of object direction information output by a camera detector in accordance with the present invention.

According to an embodiment of the present invention, the camera detector 240 may extract direction recognition information such as front, rear, left, and right of the detected object together, and output object direction information about the direction of the object. For example, in the case of an airplane, which is an embodiment of a large object having an irregular shape, as illustrated in FIG. 4, while recognizing the airplane as a bounding box 410, the camera detector 240 can recognize the direction of the airplane as left heading of FIG. 4a, right heading of FIG. 4b, rear heading of FIG. 4c, or front heading of FIG. 4d, according to the heading of the airplane.

According to another embodiment of the present invention, the object direction information may be expressed as a rotation angle with respect to a direction in which a current object is placed with respect to a predetermined reference direction. For example, the front heading of the airplane of FIG. 4d is taken as the reference direction. Then, when the current airplane is placed in the left heading as in FIG. 4a, the object direction information may be expressed as +90°, and when the current airplane is placed in the right heading as in FIG. 4b, the object direction information may be expressed as −90° (or +270°).

Figure 5:
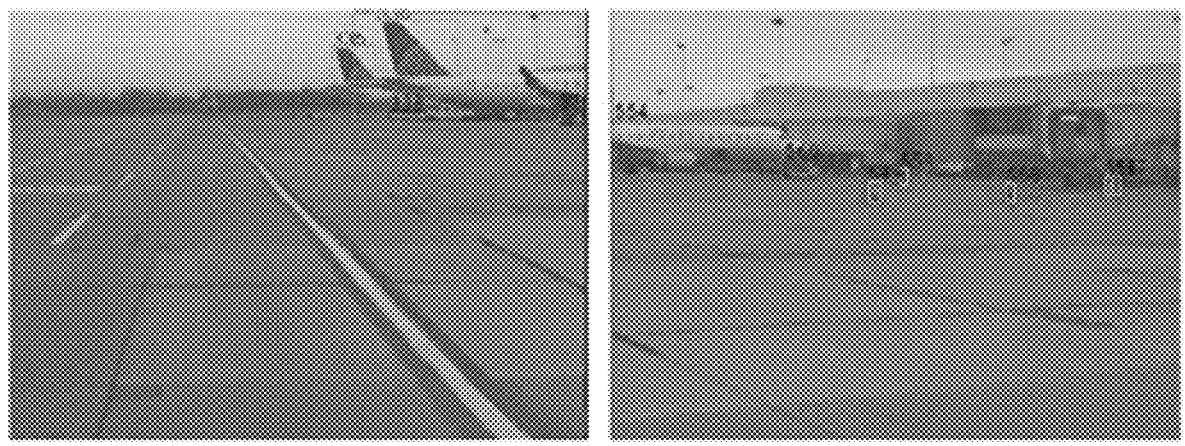
FIG. 5 illustrates an exemplary embodiment of object recognition information including a bounding box for a part of an object rather than the entire object output by the camera detector in accordance with the present invention.

In the case of a camera, there is a restriction on a field of view, and an object such as an airplane has a very large size, so that only a part of the object rather than the entire object is detected in one image in many cases. According to an embodiment of the present invention, as illustrated in FIG. 5, bounding box regions in image data transmitted from cameras, including bounding box results for a part of the object rather than the entire object, can be output as object recognition information.

[Fusion Recognition Unit]

According to an embodiment of the present invention, the fusion recognition unit 250 fuses the object segmentation information output from the LIDAR detector 230 and the object recognition information output from the camera detection unit 240 to finally identify objects. According to an embodiment of the present invention, main processing targets of the fusion recognition unit 250 are point segments divided for each object included in the object segmentation information obtained from the LiDAR detector 230, and the process may be performed in a three-dimensional space domain. In an embodiment, the fusion recognition unit 250 may include a LIDAR information analysis unit 251, a camera information association unit 253, a graph expression conversion unit 255, an optimization unit 257, and a final object decision unit 259.

[Camera Information Association Unit]

According to an embodiment of the present invention, the camera information association unit 253 of the fusion recognition unit 250 may associate the object segmentation information obtained from the LiDAR detector 230 and the object recognition information obtained from the camera detection unit 240 to allocate a label (type of a recognized object) corresponding to each point segment according to a camera recognition result for each object point segment and calculate $P_{CAM}$, which is a probability for the corresponding label.

According to an embodiment of the present invention, the camera information association unit 253 may project points corresponding to point segments obtained by the LiDAR detector 230 on a camera image. As a result, the camera information association unit 253 can determine a degree at which points of the point segment obtained by the LiDAR detector 230 are formed on the bounding box region obtained by the camera detector 240, and when the points of the point segment are located in the bounding box at a certain ratio or more, the camera information association unit 253 can allocate the object label information obtained by the camera detector 240 as a label for the corresponding point segment, and calculate a probability thereof as $P_{CAM}$.

According to an embodiment of the present invention, $P_{CAM}$, which is the probability that the corresponding point segment is an object corresponding to the allocated label, can be expressed as a product of a reliability $P_{reliability}$ of the object label information obtained from the camera detector 240 and a matching ratio ($r_{point\ alloc}$) of the points located inside the bounding box among the points of the point segment.

$$P_{CAM} = P_{reliability} \times r_{point\ alloc} \quad (1)$$

Figure 6:
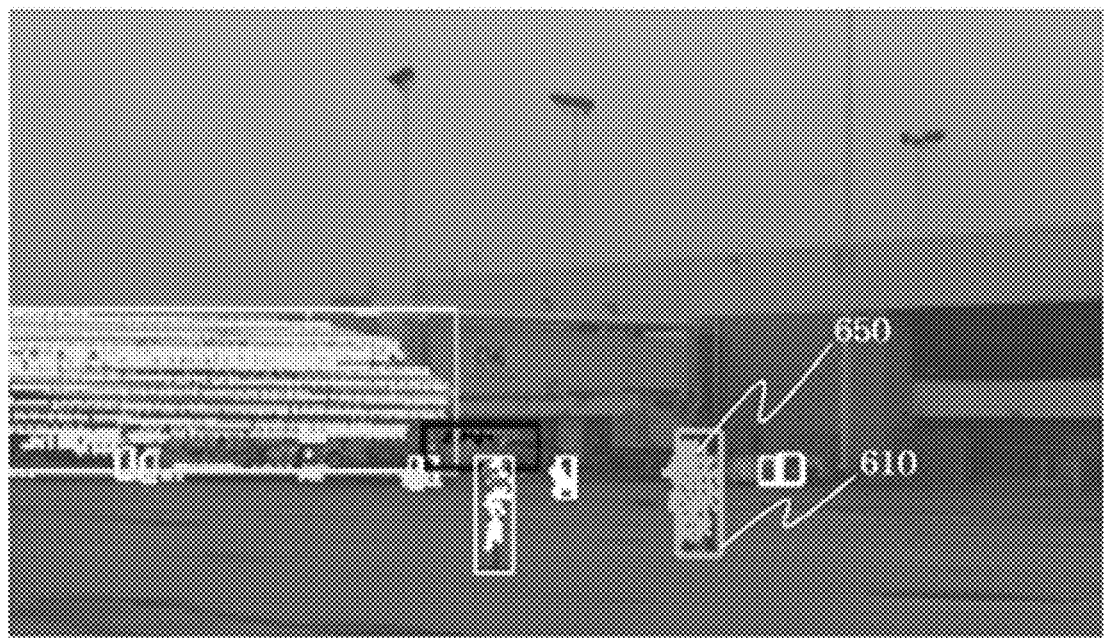
FIG. 6 illustrates an exemplary embodiment in which points of object point segments obtained by the LiDAR detector are projected onto an image-and-object recognition information obtained by the camera detector in accordance with the present invention.

FIG. 6 illustrates an embodiment in which points of point segments obtained by the LiDAR detector 230 are projected onto an image-and-object recognition information obtained by the camera detector 240. For example, in the case when the object label information derived from the camera detector 240 is 'person,' reliability information for the corresponding label is 0.96 (in the case of detecting a person with 96% confidence), and the object region information corresponds to an orange bounding box 610, when the camera information association unit 253 projects and displays orange points 650 corresponding to the corresponding point segment here, 11% of the points are outside the bounding box, and thus a matching ratio becomes $r_{point\ alloc} = 0.89$. In the end, a probability $P_{CAM} = P_{reliability} \times r_{point\ alloc} = 0.96 \times 0.89 = 0.854$ can be calculated.

According to an embodiment of the present invention, when a matching ratio of points corresponding to a point segment to a specific bounding box is less than or equal to a certain level, this case may be considered as an under-segmentation phenomenon in which an object is less segmented. Therefore, among point segments, points matching the corresponding bounding box and points not matching the corresponding bounding box may be segmented and divided into different point segments. According to an embodiment of the present invention, the matching ratio as a criterion for further segmenting the point segment may be 50% or a predetermined ratio of 50% or less.

[LiDAR Information Analysis Unit]

According to an embodiment of the present invention, the LiDAR information analysis unit 251 of the fusion recognition unit 250 may allocate a label for each point segment using the object segmentation information obtained from the LiDAR detector 230 and the object direction information obtained from the camera detector 240, and calculate $P_{LiDAR}$, which is a probability for the corresponding label.

According to an embodiment of the present invention, the LiDAR information analysis unit 251 may find a point segment (that is, a center point segment) corresponding to a center of an object based on direction vectors and sizes of point segments from the LiDAR detector 230, and calculate $P_{LiDAR}$, which is a probability that the surrounding point segments correspond to the same object as an object to which the center point segment corresponds, based on a relationship with surrounding point segments.

According to an embodiment of the present invention, the LiDAR information analysis unit 251 may calculate a direction vector of points by using singular value decomposition with respect to the point segments. For example, as a point segment that has a largest direction vector and satisfies a size condition in analysis results by singular value decomposition on point segments, a point segment having the same direction as object direction information obtained by the camera detector 240 may be recognized as a center point segment corresponding to the center of the object.

According to an embodiment of the present invention, the LiDAR information analysis unit 251 may find a center point segment and a direction vector thereof, and then analyze a relationship between direction vectors of the surrounding point segments and a direction vector of the center point segment. For example, in the case of an object with a mixture of a convex shape and a concave shape, the object may be divided into a plurality of point segments with a concave part as a boundary. Therefore, direction vectors of the center point segment and the surrounding point segments may be considered so that $P_{LiDAR}$, which is a probability of a single object, is high when there is a correlation therebetween.

According to an embodiment of the present invention, $P_{LiDAR}$ can be calculated by the following Equation (2).

$$\vec{v}_i = c_c - c_i$$

$$dist_i = |\vec{v}_c||\vec{v}_i||\sin 2\theta_{v_c,v_i}|$$

$$P_{LiDAR} = e^{-\lambda dist_i} \quad (2)$$

Here, $c_c$ is a centroid point of the center point segment, and $c_i$ is a centroid point of an $i^{th}$ point segment. $\vec{v}_c$ is a direction vector of the center point segment, and $\vec{v}_i$ is a vector from the centroid point of the center point segment to the centroid point of the $i^{th}$ point segment. In addition, $\theta_{v_c,v_i}$ is an angle formed by two direction vectors $\vec{v}_c$ and $\vec{v}_i$, and $\lambda$ is a parameter that determines a distribution of the probability $P_{LiDAR}$ and is a constant.

In addition, $|\vec{v}_i|$ is the distance between the centroid point of the center point segment and the centroid point of the $i^{th}$ point segment, and $|\sin 2\theta_{v_c,v_i}|$ has a lowest value when $\theta_{v_c,v_i}$ is 0, 90, 180, or 270 degrees. Thus, the probability $P_{LiDAR}$ is higher when a distance to the center point segment is shorter and a relationship with the center point segment is closer to 0, 90, 180, or 270 degrees.

Figure 7:
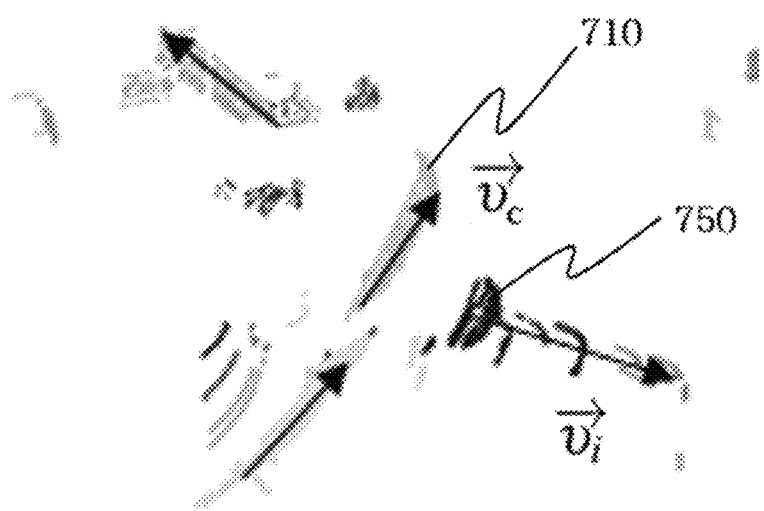
FIG. 7 illustrates an exemplary embodiment in which a direction vector is analyzed by a LIDAR information analysis unit in accordance with the present invention.

FIG. 7 illustrates an embodiment in which the direction vector is analyzed by the LiDAR information analysis unit 251.

FIG. 7 illustrates a direction vector $\vec{v}_c$ of a center point segment 710 and a direction vector vi of an $i^{th}$ point segment 750 determined by the LiDAR information analysis unit 251 through singular value decomposition. $P_{LiDAR}$ is calculated by Equation (2) according to an embodiment of the present invention. Since the $i^{th}$ point segment 750 is close to the center point segment 710 and the two direction vectors have a relationship close to 90 degrees, $P_{LiDAR}$ has a high probability value.

[Graph Expression Conversion Unit]

According to an embodiment of the present invention, the graph expression conversion unit 255 of the fusion recognition unit 250 may convert and express object segmentation information output from the LiDAR detector 230 in a graph format.

According to an embodiment of the present invention, the object segmentation information output from the LiDAR detector 230 includes point segments, and the graph expression conversion unit 255 expresses each point segment as a node of a graph and expresses a relationship between respective point segments as an edge. For example, the relationship between respective point segments may express a geometric relationship (for example, distance, height, or direction) or a characteristic difference relationship (for example, difference in reflection intensity obtained from the LiDAR sensor, a difference in color or a difference in black-and-white intensity obtained from the camera sensor, a difference in thermal temperature obtained from a thermal imaging camera, etc.) as an edge of graph expression.

According to an embodiment of the present invention, the graph expression conversion unit 255 may generate a graph using the existing graph expression technique for the point segments. For example, a graph may be generated by using a Delaunay triangulation method, a Voronoi diagram method, etc. The present invention may utilize other graph expression techniques to convert object segmentation information into a graph, and is not limited to the above-described conversion technique.

Figure 8:
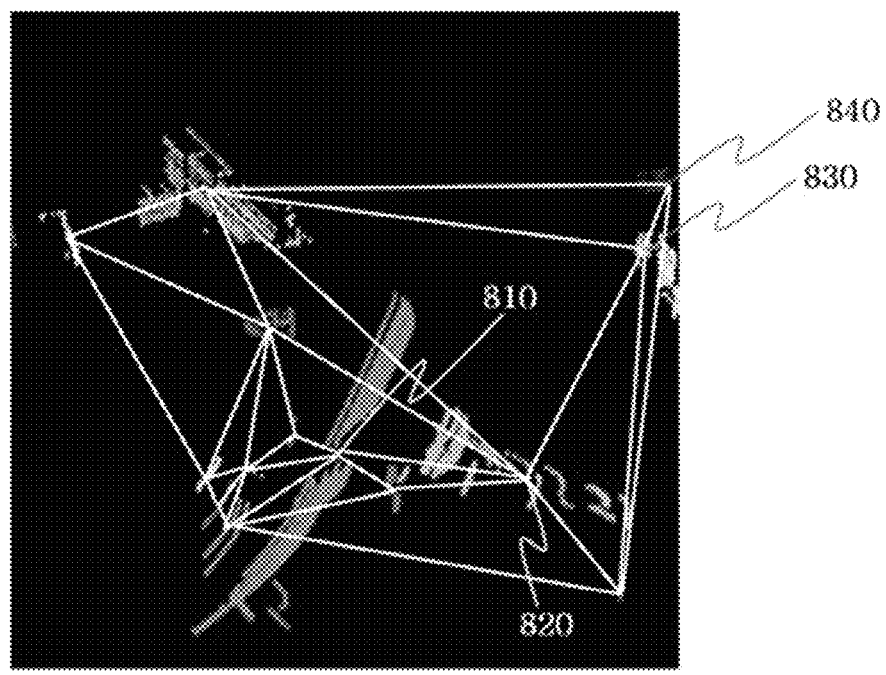
FIG. 8 illustrates an exemplary embodiment in which object point segments are converted into graphs using Delaunay triangulation in accordance with the present invention.

FIG. 8 illustrates an embodiment in which point segments are converted into a graph using the Delaunay triangulation method. In the example of FIG. 8, each point segment is represented by a node, and a geometric relationship is represented by an edge.

[Optimization Unit]

According to an embodiment of the present invention, the optimization unit 257 of the fusion recognition unit 250 may determine a final label of the point segments (nodes of the graph expression) using $P_{LiDAR}$ obtained from the LiDAR information analysis unit 251 and $P_{CAM}$ obtained from the camera information association unit 253 based on the graph format of the object segmentation information obtained from the graph expression conversion unit 255.

According to an embodiment of the present invention, the optimization unit 257 may utilize an optimization technique using a graph-based probability. For example, the optimization unit 257 can utilize a conditional random field (CRF), a Markov random field, an evidence theory or a Dempster-Shafer theory, a Bayesian classifier or Naïve Bayes Classification, etc. as an optimization technique using probability. However, the invention is not limited thereto.

According to an embodiment of the present invention, the optimization unit 257 may use a CRF among the optimization techniques, and an embodiment thereof will be described below.

The optimization unit 257 may use an energy function Φ(L|S) of a graph including a unitary term for each node (corresponding to a point segment) and a pairwise term determined by a relationship between nodes. The probability P(L|S) used for optimization is a probability value with respect to labels (L) for point segments (S, nodes of graph expression), and may be expressed by the energy function Φ(L|S) as in the following Equations (3) and (4).

$$P(L|S)=1/z\exp(-\Phi(L|S)) \quad (3)$$

$$\Phi(L|S)=\Sigma_{l_i \in L} U(l_i|s_i)+\Sigma_{C \in cl(G)} \varphi(l_C|s_C) \quad (4)$$

In Equation (4), $\Sigma_{l_i \in L} U(l_i|s_i)$ expresses a unitary term, and $U(l_i|s_i)$ expresses a probability that the corresponding point segment i corresponds to a target label according to a result (label and a probability $P_{LiDAR}$ thereof) recognized by the LiDAR information analysis unit 251 for one point segment i and a result (label and a probability $P_{CAM}$ thereof) recognized by the camera information association unit 253. Here, the target label may refer to a label of the center point segment.

According to an embodiment of the present invention, $U(l_i|s_i)$ may be expressed by the following Equations (5) and (6).

$$U(l_i|s_i)=-\ln(P(l_i|s_i)) \quad (5)$$

$$\ln(P(l_i|s_i))=\ln(P_{CAM}(l_i|s_i))+\gamma \cdot \ln(P_{LiDAR}(l_i|s_i))-\kappa \cdot \mu(l_i|s_i) \quad (6)$$

Here, γ and κ are predetermined weight parameters and constants, and $\mu(l_i|s_i)$ is a function that outputs a value '1' when the label ($l_{i,CAM}$) of the $i^{th}$ point segment by the camera information association unit 253 and the label ($l_{i,LiDAR}$) of the $i^{th}$ point segment by the LiDAR information analysis unit 251 are different from each other, and outputs a value '0' when the labels are the same. That is, this function can be expressed by the following Equation (7).

$$\mu(l_i|s_i)=[l_{i,CAM} \neq l_{i,LiDAR}] \quad (7)$$

In conclusion, $P(l_i|s_i)$ has a higher value when the labels are determined to be the same by the camera information association unit 253 and the LiDAR information analysis unit 251 and $P_{CAM}(l_i|s_i)$ and $P_{LiDAR}(l_i|s_i)$, which are probabilities of being recognized as the corresponding labels computed by the respective units, have higher values. As a result, the unitary term acts to increase a probability of being determined as one object when it is determined to be the same label with high probability by the camera information association unit 253 and the LiDAR information analysis unit 251.

In Equation (4), $\Sigma_{C \in cl(G)} \varphi(l_C|s_C)$ expresses a pairwise term, and for a pair (C) of two different point segments (i, j), $\varphi(l_C|s_C)$ expresses a probability that the two point segments (i, j) correspond to the same target label depending on the geometrical and/or characteristic relationship between the two point segments. Here, the target label may refer to a label of the center point segment.

According to an embodiment of the present invention, $\varphi(l_C|s_C)$ may be calculated by the following Equations (8) and (9).

$$\varphi(l_C|s_C)=-\ln(P(l_C|s_C)) \quad (8)$$

$$\ln(P(l_C|s_C)) = -\mu(l_C|s_C) \cdot \left( \frac{\|c_i - c_j\|^2}{2\sigma_d^2} + \frac{\|I_i - I_j\|^2}{2\sigma_I^2} \right) \quad (9)$$

Here, $c_i$ is the centroid point of the $i^{th}$ point segment, and $\sigma_d^2$ is a variance value of distances between point segments. $I_i$ is the average intensity of the $i^{th}$ point segment, and $\sigma_I^2$ is a variance value of intensities of point segments. $\mu(l_C|s_C)$ is a function that outputs a value '1' when the label ($l_i$) for the $i^{th}$ point segment and a label ($l_j$) for a $j_{th}$ point segment are different from each other, and outputs a value '0' when the labels are the same. Here, a label ($l_i$, $l_j$) for the point segment may be determined by combining information obtained from the LiDAR detector and the camera detector. That is, the function can be expressed by the following Equation (10).

$$\mu(l_C|s_C)=[l_i \neq l_j] \quad (10)$$

In conclusion, the pairwise term expresses the edge representing the relationship between two nodes in the graph-expressed object segmentation information as a function. When a geometric distance is considered as the relationship between the nodes, the probability is high and two nodes can be recognized as a single object when one node corresponding to the target label and the adjacent node have the same label. In addition, nodes corresponding to point segments far away from the node corresponding to the target label have a relatively large penalty, and thus the corresponding node may be excluded from the target label.

According to an embodiment of the present invention, the relationship between nodes expressed as a pairwise term can consider one or more of various types of information such as a difference in average height, a difference in direction in a direction vector, a difference in average reflection intensity, a difference in color space distribution, a difference in average black-and-white intensity, a difference in average thermal temperature, etc. (of points belonging to a point segment corresponding to each node) in addition to the previously examined geometric distance. However, the invention is not limited thereto.

In FIG. 8, in which point segments are converted into a graph expression, considering the pairwise term regarding the geometric distance, a node 820 adjacent from a node 810 corresponding to the center point segment has a high probability of being recognized as the same object (an airplane in FIG. 8), and nodes far away (for example 830 and 840) have a high probability of being separated and recognized as different objects.

According to an embodiment of the present invention, when a detection probability value is assigned to a unitary term and pairwise term function and the energy function is calculated, a final set of labels (label set) for point segments where the energy is finally minimized can be obtained. For example, the label set can be derived as in Equation (11) below.

$$L^* = \underset{L}{\mathrm{argmin}}(L|S) \qquad (11)$$
$$= \underset{L}{\mathrm{argmin}}\left(\sum_{l_i \in L} U(l_i|s_i) + \sum_{C \in cl(G)} \varphi(l_C|s_C)\right)$$
$$= \underset{L}{\mathrm{argmin}}\left(\sum_{l_i \in L} \ln(P(l_i|s_i)) + \sum_{C \in cl(G)} \ln(P(l_C|s_C))\right)$$

In conclusion, according to Equation (11), it is possible to derive a label set that increases an output of an energy function when label recognition result values of respective point segments are the same, $P_{LiDAR}$ and $P_{CAM}$, which are probabilities of being recognized as the corresponding label, are high, a geometric distance from the center point segment is short, or a close relationship is obtained by having the same characteristic based on label recognition result values of the LiDAR information analysis unit 251 and the camera information association unit 253.

[Final Object Determination Unit]

According to an embodiment of the present invention, the final object determination unit 259 of the fusion recognition unit 250 may combine separated nodes by label sets of nodes predicted to be the same object derived from the optimization unit 257 and derive a final object recognition result. The nodes of the graph expression correspond to point segments, and the final object recognition result is that nodes corresponding to the point segments are grouped again according to a label, which may be referred to as an object point group in the present invention. In conclusion, the object point group is a group of over-segmented point segments grouped according to the final object recognition result, and the point segment that is not over-segmented in the first place becomes an object point group itself.

Figure 9:
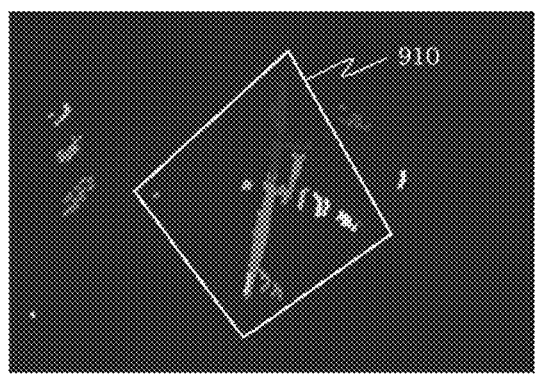
FIG. 9 illustrates an exemplary embodiment of a final object recognition result in accordance with the present invention.
Figure 9:
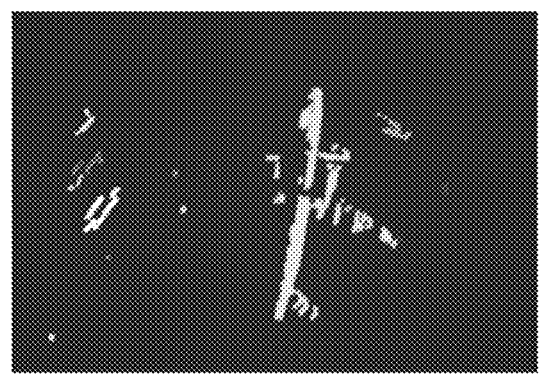

FIG. 9a is an embodiment of object segmentation information including point segments derived from the LiDAR detector 230. As illustrated in FIG. 9a, an airplane 910 is over-segmented into a plurality of point segments indicated by different colors. The final object determination unit 259 may finally determine the labels of the point segments according to the label set of the optimization unit 257 as illustrated in FIG. 9b. As in FIG. 9b, point segments corresponding to the airplane 910 can be determined as one object point group expressed in yellow-green, and the over-segmentation problem is resolved.

Figure 10:
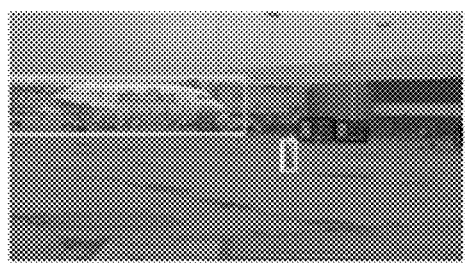
FIG. 10 illustrates an exemplary embodiment of an input and output of a fusion recognition unit in accordance with the present invention.
Figure 10:
Figure 10:

According to an embodiment of the present invention, from object recognition information illustrated in FIG. 10a output by the camera detector 240 and object segmentation information illustrated in FIG. 10b output by the LIDAR detector 230, it is possible to obtain a final recognition result illustrated in FIG. 10c by utilizing a graph-based optimization technique in the fusion recognition unit 250.

An object detection system and method according to the present invention have an effect that an object having a complex shape or a large size can be accurately recognized.

In addition, the present invention has an effect that one or more pieces of information among an exact size, shape, direction, and type (or label) of an object can be accurately recognized by fusing sensing results obtained from two or more sensors.

In addition, the present invention has an effect that an autonomous driving device can accurately recognize an object having a complex shape or a large size to set a drivable path.

Even though the object detection method and system according to the present invention have been described above with reference to the drawings of the present application, the present invention is not limited to the structures and methods shown and described herein. Various hardware and/or software other than those disclosed herein may be used as a configuration of the present invention, and the scope of the rights is not limited to the configuration and method disclosed herein. Those skilled in the art will understand that various changes and modifications can be made within the scope of the object and effect pursued by the present invention. In addition, a part expressed in the singular or the plural in the present specification may be construed to include both the singular and the plural, except for essential cases.

What is claimed is:

1. A sensor fusion object detection system capable of solving the over-segmentation problem that may occur in recognizing an object having a complex shape or a large size, the system comprising:
    a LiDAR detector that derives an object-instance-wise segmentation information including point segments for each object obtained by clustering a point cloud from one or more LiDAR sensors;
    a camera detector that derives an object recognition information for each object from an image obtained from a camera sensor; and
    a fusion recognition unit that derives object point groups segmented for each object by using the object recognition information and the object segmentation information,
    wherein the fusion recognition unit further includes an optimization unit that derives the object point groups by using a graph-based probability optimization technique based on a first probability as to whether each point segment corresponds to a particular object and a second probability as to whether two different point segments correspond to the same object, calculated based on the object segmentation information and the object recognition information, wherein the object recognition information includes object region information and object label information for each recognized object, the fusion recognition unit further includes a camera information association unit that calculates a third probability, which is a probability that each point segment corresponds to the object label information, based on a ratio at which points corresponding to each point segment of the object segmentation information match the corresponding object region information, and the optimization unit calculates the first probability based on the third probability.

2. The sensor fusion object detection system of claim 1, wherein the object recognition information further includes reliability information which is a probability that a recognized object corresponds to the object label information, and the camera information association unit calculates the third probability by multiplying the reliability information by a ratio at which points corresponding to each point segment of the object segmentation information match the corresponding object region information.

3. The sensor fusion object detection system of claim 1, wherein the object recognition information includes object direction information for each recognized object, the fusion recognition unit further includes a LiDAR information analysis unit that determines a center point segment among the point segments based on the object direction information, and calculates a fourth probability which is a probability that each point segment corresponds to the same object as an object to which the center point segment corresponds in consideration of a distance and geometric relationship with the center point segment, and the optimization unit calculates the first probability based on the fourth probability.

4. The sensor fusion object detection system of claim 3, wherein the LiDAR information analysis unit calculates the fourth probability to be high when a direction vector of the center point segment and a direction vector of each point segment are toward a vertical or parallel geometric pattern.

5. The sensor fusion object detection system of claim 1, wherein the fusion recognition unit further includes a graph expression conversion unit that converts the object segmentation information into a graph format by expressing the point segments as nodes and expressing a relationship between the point segments as an edge.

6. The sensor fusion object detection system of claim 5, wherein a relationship between the object point segments, which can be expressed as the edge by the graph expression conversion unit, includes a geometric relationship between the object point segments and/or a characteristic difference relationship between the object point segments.

7. The sensor fusion object detection system of claim 1, wherein the object recognition information includes, object direction information for each recognized object, the fusion recognition unit further includes a LiDAR information analysis unit that determines a center point segment among the point segments based on the object direction information, and calculates a fourth probability, which is a probability that each point segment corresponds to the same object as an object to which the center point segment corresponds, in consideration of a distance and geometric relationship with the center point segment, and the optimization unit calculates the first probability based on the third probability and the fourth probability.

8. The sensor fusion object detection system of claim 1, wherein the optimization unit calculates the second probability based on one or more of a difference (distance) in centroid point, a difference in average height, a difference in direction of direction vectors, a difference in average reflection intensity, a difference in color space distribution, a difference in average black-and-white intensity, or a difference in average thermal temperature between two different point segments.

9. The sensor fusion object detection system of claim 1, wherein the first probability is determined based on whether the object segmentation information of the LiDAR detector coincides with the object recognition information of the camera detector.

10. A sensor fusion object detection method capable of solving the over-segmentation problem that may occur in recognizing an object having a complex shape or a large size, the method comprising:

deriving an object segmentation information including point segments for each object by clustering a point cloud obtained from a LiDAR sensor;

deriving an object recognition information for each object from an image obtained from a camera sensor; and deriving object point groups segmented for each object using the object recognition information and the object segmentation information, wherein, in the step of deriving the object point groups segmented for each object, deriving the object point groups by using a graph-based probability optimization technique based on a first probability as to whether each point segment corresponds to a particular object and a second probability as to whether two different point segments correspond to the same object, calculated based on the object segmentation information and the object recognition information, wherein the object recognition information includes object region information and object label information for each recognized object, the method further includes:

calculating a third probability, which is a probability that each point segment corresponds to the object label information, based on a ratio at which points corresponding to each point segment of the object segmentation information match the corresponding object region information, before deriving the object point groups segmented for each group, and in the step of deriving the object point groups segmented for each object, calculating the first probability based on the third probability.

11. The sensor fusion object detection method of claim 10, wherein the object recognition information further includes reliability information, which is a probability that a recognized object corresponds to the object label information, and in the step of calculating the third probability, calculating the third probability by multiplying the reliability information by a ratio at which points corresponding to each point segment of the object segmentation information match the corresponding object region information.

12. The sensor fusion object detection method of claim 10,
wherein the object recognition information includes object direction information for each recognized object,
the method further includes determining a center point segment among the point segments based on the object direction information, and calculating a fourth probability, which is a probability that each point segment corresponds to the same object as an object to which the center point segment corresponds, in consideration of a distance and geometric relationship with the center point segment, before deriving the object point groups segmented for each group, and
in the step of deriving the object point groups segmented for each object, calculating the first probability based on the fourth probability.

13. The sensor fusion object detection method of claim 12,
wherein in the step of calculating the fourth probability, calculating the fourth probability to be high when a direction vector of the center point segment and a direction vector of each point segment are toward a vertical or parallel geometric pattern.

14. The sensor fusion object detection method of claim 10, further includes
converting the object segmentation information into a graph format by expressing the point segments as nodes and expressing a relationship between the point segments as an edge, before deriving the object point groups segmented for each group.

15. The sensor fusion object detection method of claim 14,
wherein in the step of converting the object segmentation information into a graph format,
a relationship between the object point segments, which can be expressed as an edge, includes a geometric relationship between the object point segments and/or a characteristic difference relationship between the object point segments.

16. The sensor fusion object detection method of claim 10,
wherein the object recognition information includes object direction information for each recognized object,
the method further includes,
determining a center point segment among the point segments based on the object direction information, and calculating a fourth probability, which is a probability that each point segment corresponds to the same object as an object to which the center point segment corresponds, in consideration of a distance and geometric relationship with the center point segment, and
in the step of deriving the object point groups segmented for each object, calculating the first probability based on the third probability and the fourth probability.

17. The sensor fusion object detection method of claim 10,
wherein in the step of deriving the object point groups segmented for each object, calculating the second probability based on one or more of a difference (distance) in centroid point, a difference in average height, a difference in direction of a direction vector, a difference in average reflection intensity, a difference in color space distribution, a difference in average black-and-white intensity, or a difference in average thermal temperature between two different point segments.

18. The sensor fusion object detection method of claim 10,
wherein the first probability is determined based on whether an object recognition result based on the object segmentation information coincides with an object recognition result based on the object recognition information.

* * * * *